United States Patent
Gupta et al.

(10) Patent No.: US 8,911,511 B2
(45) Date of Patent: Dec. 16, 2014

(54) SYSTEM FOR DESALTING FUEL OIL USING A STEAM JET PUMP

(75) Inventors: Abhijit Gupta, Karnataka (IN); John Victor Hains, Simpsonville, SC (US); Gary Cletus Mobley, Greenville, SC (US); Sakshi Kapoor, Madhya Pradesh (IN)

(73) Assignee: General Electric Company, Schenectady, NY (US)

( * ) Notice: Subject to any disclaimer, the term of this patent is extended or adjusted under 35 U.S.C. 154(b) by 154 days.

(21) Appl. No.: 13/291,661

(22) Filed: Nov. 8, 2011

(65) Prior Publication Data

US 2013/0111804 A1   May 9, 2013

(51) Int. Cl.
| | | |
|---|---|---|
| B04B 11/00 | (2006.01) | |
| C10L 8/00 | (2006.01) | |
| C10G 31/08 | (2006.01) | |
| C10G 33/06 | (2006.01) | |

(52) U.S. Cl.
CPC ............ C10G 31/08 (2013.01); C10G 33/06 (2013.01); *C10G 2300/807* (2013.01); *C10G 2300/1037* (2013.01)
USPC .............................................. 44/300; 494/25

(58) Field of Classification Search
USPC ................................ 585/648; 44/300; 494/25
See application file for complete search history.

(56) References Cited

U.S. PATENT DOCUMENTS

| | | |
|---|---|---|
| 2,319,188 A | 5/1943 | Mellett |
| 2,823,181 A | 2/1958 | Packie et al. |
| 3,505,194 A | 4/1970 | Martin |
| 6,739,288 B1 | 5/2004 | Kumamoto |
| 2002/0119051 A1 | 8/2002 | Campbell et al. |
| 2007/0004952 A1* | 1/2007 | McCoy et al. ................ 585/648 |

OTHER PUBLICATIONS

Kabakov, "Prospects for using jet devices to solve environmental problems," Int. J. Environ. Technol. Manage., vol. 3, No. 1, Jan. 1, 2003, pp. 89-105, XP002692872.
Search Report and Written Opinion from EP Application No. 12191807.2 dated Mar. 20, 2013.

* cited by examiner

*Primary Examiner* — Prem C Singh
*Assistant Examiner* — Chantel Graham
(74) *Attorney, Agent, or Firm* — Cantor Colburn LLP

(57) ABSTRACT

A method and system for desalting a fuel having a salt therein is disclosed. A jet of superheated steam is provided at a selected pressure and fuel is drawn into the jet of superheated steam to form a mixture of the fuel and the superheated steam. The mixture is injected into a centrifuge to desalt the fuel.

18 Claims, 2 Drawing Sheets

SYSTEM FOR DESALTING FUEL OIL USING A STEAM JET PUMP

BACKGROUND OF THE INVENTION

The subject matter disclosed herein relates to systems and methods for liquid fuel desalination. Raw fuel can have various salts therein, which can be corrosive to engines, turbines, and various other machines that come in contact with the fuel. Therefore, raw fuel is typically desalinated prior to its use in such machines. The desalination process generally includes the stages of heating the fuel, adding water to the fuel, accelerating the fuel and injecting the fuel-water mixture into a centrifuge which separates the fuel from the water. Heating the fuel reduces the viscosity and density of fuel oil to thereby increase the throughput of the centrifuge. Adding water to the fuel causes the salt to transfer from the fuel to the water so that the separation at the centrifuge leaves clean fuel. Typically, the fuel injection into the centrifuge is required to be within a range specified by a manufacturer of the process components. These stages of heating, addition of water and fuel acceleration can be inefficient as well as costly. The present disclosure therefore reveals a method of preparing the fuel for desalination at a centrifuge in a single process.

BRIEF DESCRIPTION OF THE INVENTION

According to one aspect of the invention, a method of desalinating a fuel having a salt therein is provided that includes providing a jet of superheated steam at a selected velocity; drawing the fuel into the jet of superheated steam to form a mixture of the fuel and the superheated steam; and injecting the mixture into a centrifuge to desalt the fuel.

According to another aspect of the invention, a system for desalting a fuel using a jet pump is disclosed that includes a motive fluid nozzle of the jet pump configured to provide a jet of a superheated steam at a selected velocity; an enclosed passage of the jet pump configured to receive the jet of superheated steam and the fuel, wherein the superheated steam and the fuel form a mixture in the passage; and a centrifuge configured to receive the mixture of the superheated steam and the fuel from the jet pump to desalt the fuel.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
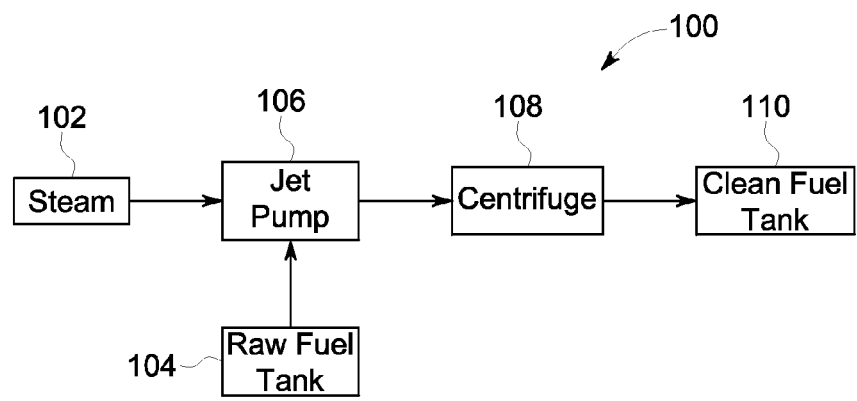
FIG. 1 a diagram of an exemplary system for desalinating fuel in one embodiment of the present disclosure.

FIG. 1 shows a diagram of an exemplary system 100 for desalinating fuel in one embodiment of the present disclosure. The system 100 includes a source of superheated steam 102 and a tank of raw fuel storage tank 104 that stores raw fuel therein, the raw fuel containing a salt. Jet pump 106 creates a jet stream of the superheated steam. The raw fuel is drawn from raw fuel storage tank 104 into the jet and mixes with the superheated steam. The steam condenses to water in the mixture, thereby heating the raw fuel in the mixture and providing water to the mixture. Salt in the raw fuel is absorbed by the condensed water, resulting in a mixture of salted water and desalinated fuel. The mixture of desalinated fuel and salted water is injected into centrifuge 108 which separates the salted water from the desalinated fuel. The desalinated fuel is then stored at clean fuel storage tank 110.

Figure 2:
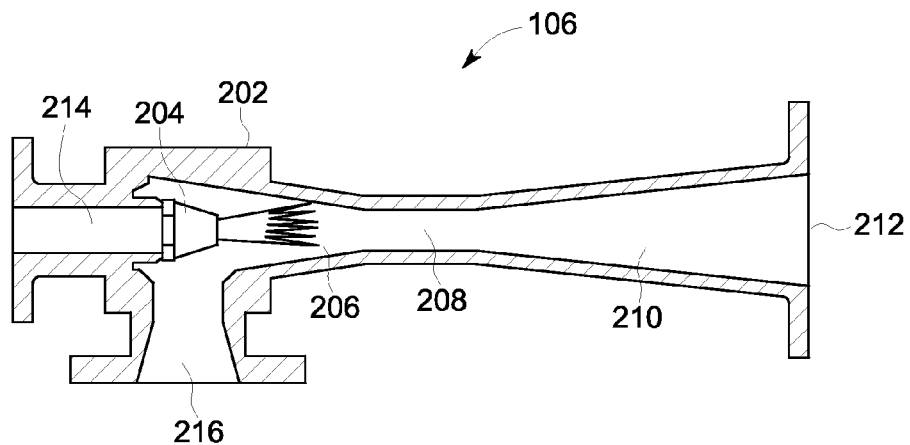
FIG. 2 is a detailed illustration of an exemplary jet pump in one embodiment of the present disclosure.

FIG. 2 shows a detailed illustration of an exemplary jet pump 106 in one embodiment of the present disclosure. The jet pump includes a chamber 202 that receives a jet of superheated steam via a motive fluid nozzle 204 and receives fuel via inlet 216. The jet pump further includes an enclosed passage downstream of the chamber that includes a converging nozzle 206, throat 208 and diffuser 210. The jet is directed into converging nozzle 206 which narrows to throat 208 downstream of the converging nozzle 206. The jet increases in velocity as it enters throat 208, thereby causing a low pressure region at the throat. The low pressure region at the throat therefore draws fuel from the raw fuel storage tank 104 via inlet 216 into the jet. The superheated steam and fuel thus combine to form a mixture in diffuser region 210. While the mixture is in the diffuser region 210, heat is transferred from the steam to the fuel, thereby raising the temperature of the fuel. In one aspect, the heat transfer results in condensation of the steam to water. Therefore, in one aspect, the heat absorbed by the fuel is a latent heat of condensation of the steam. The mixture exits the diffuser region 210 and is injected into centrifuge inlet 212. Due to the condensation in the diffuser 210, the mixture received at centrifuge inlet 212 is a mixture of fuel and water, typically from about 3% to about 10% water. During the condensation, salt is typically transferred from the fuel to the condensed water. Centrifuge 108 therefore receives the fuel-water mixture from the enclosed passage and separates the salted water from the fuel to yield desalted fuel, which is then stored at clean fuel tank 110 (FIG. 1). Using the methods disclosed herein, fuel can typically be desalted to about 1 ppm maximum salt levels.

The jet of superheated steam therefore provides, in a single process, heat to the raw fuel, water to moisten the raw fuel and a motive force to give velocity to the raw fuel. In one aspect, the jet of superheated steam heats the raw fuel via direct heat exchange with the raw fuel. In one embodiment, steam at motive fluid nozzle 204 is provided at about 176° C. (350° F.). Through heat absorption, the fuel increases in temperature of the fuel by about 55° C. (131° F.). Stated differently, the fuel temperature at the inlet 212 is 55° C. (131° F.) greater than the fuel temperature stored at the raw fuel storage tank 104.

In another aspect, the jet of superheated steam provides moisture to the raw fuel as a result of heat transfer and condensation in the mixture region. The mixture when received at the centrifuge typically includes between from about 5% to about 10% water.

Figure 3:
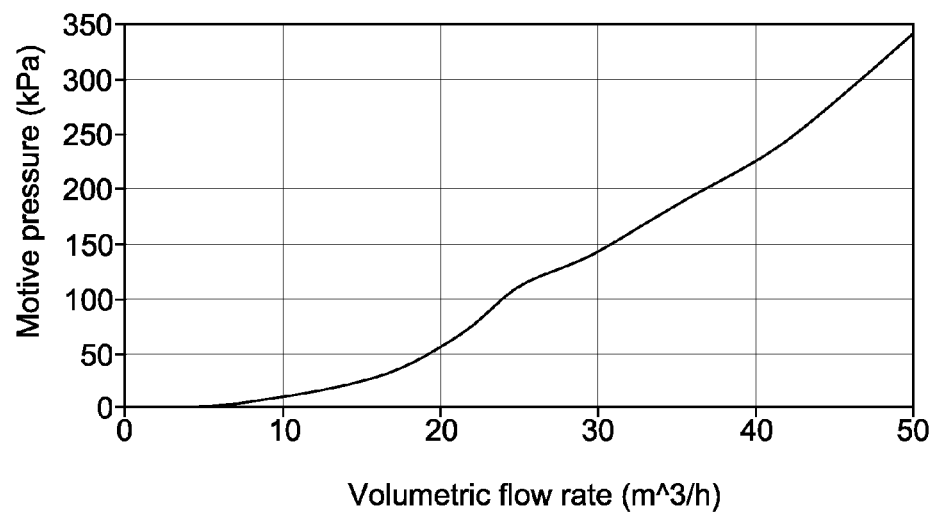
FIG. 3 shows an exemplary relation between motive pressure and volumetric flow rate at a centrifuge in an exemplary embodiment.

In another aspect, the jet of superheated steam 214 is provided at a selected velocity and pressure depending on volumetric flow rate at the centrifuge. FIG. 3 shows an exemplary relation between volumetric flow rate and inlet pressure for fluids injected into an exemplary centrifuge. Inlet pressure at the centrifuge generally is increased as the volumetric flow rate at the centrifuges increases. Exemplary FIG. 3 can be used to select a motive pressure of the jet of superheated steam that enables a selected volumetric flow rate of the fuel-water mixture at the centrifuge. In one embodiment, the jet at nozzle 204 is created at a motive pressure of about 150 psia, typically resulting in a pressure at the centrifuge inlet of about 60 psia.

Therefore, in one aspect, the present disclosure provides a method of desalting a fuel having a salt therein, the method including: providing a jet of superheated steam at a selected velocity; drawing the fuel into the jet of superheated steam to form a mixture of the fuel and the superheated steam; and injecting the mixture into a centrifuge to desalt the fuel. The method further includes providing the jet of superheated steam to impart at least one the group consisting of: (i) a selected speed; (ii) a selected temperature; and (iii) a selected water content of the mixture. The salted fuel is heated in the mixture via absorption of heat from the jet of superheated steam. The absorbed heat can include a latent heat of condensation of the jet of superheated steam. The mixture injected into the centrifuge therefore includes water due to the condensation of the jet of superheated steam. The mixture injected into the centrifuge includes from about 3% to about 10% water. The injection into the centrifuge includes desalinated fuel and salted water. The method further includes providing the jet of superheated steam at a pressure which provides injection of the mixture into the centrifuge at or above at least one of (i) a selected velocity; and (ii) a selected pressure. In one embodiment, the selected pressure is about 150 psi.

In another aspect, the present disclosure provides a system for desalting a fuel using a jet pump, including: a motive fluid nozzle of the jet pump configured to provide a jet of a superheated steam at a selected velocity; an enclosed passage of the jet pump configured to receive the jet of superheated steam and the fuel, wherein the superheated steam and the fuel form a mixture in the enclosed passage; and a centrifuge configured to receive the mixture of the superheated steam and the fuel from the jet pump to desalt the fuel. The motive fluid nozzle is configured to provide the jet of superheated steam to impart at least one selected from the group consisting of: (i) a selected speed; (ii) a selected temperature; and (iii) a selected water content of the mixture. The passage is configured to allow heat transfer in the mixture. The motive fluid nozzle can be configured to provide the jet of superheated steam at a temperature for transfer of a latent heat of condensation in the mixture. The centrifuge receives a mixture that includes water via condensation of the superheated steam. The mixture of water to fuel received at the centrifuge is from about 3% to about 10%. The centrifuge is configured to separate the received mixture into a desalinated fuel and salted water. In various embodiments, the motive fluid nozzle is configured to provide the jet of superheated steam at a pressure which selected for injection of the mixture into the centrifuge above at least one of: (i) a selected velocity; and (ii) a selected pressure. In one embodiment, the selected pressure is about 150 psi. The enclosed passage can further include a low pressure region configured to draw the fuel from a fuel storage tank into the jet of superheated steam. A diffuser of the enclosed passage downstream of the low pressure region is configured to allow for the heat transfer and water condensation in the mixture.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of desalting a fuel having a salt therein, comprising:
   injecting a jet of superheated steam at a selected velocity into a chamber, wherein the jet of superheated steam exits the chamber into a centrifuge via a diffuser;
   drawing the fuel into the jet of superheated steam into the chamber from a storage tank via a pressure region caused by the velocity of the jet of superheated steam to form a mixture of the fuel and the superheated steam in the chamber, wherein the jet of superheated steam pumps the fuel from the storage tank to the centrifuge;
   allowing the superheated steam to moisten the fuel in the diffuser and the fuel to absorb heat from the superheated steam in the diffuser; and
   desalting the heated and moistened fuel in the centrifuge.

2. The method of claim 1, further comprising providing the jet of superheated steam to impart at least one the group consisting of: (i) a selected speed; (ii) a selected temperature; and (iii) a selected water content of the mixture.

3. The method of claim 1, wherein the absorbed heat further comprises a latent heat of condensation of the jet of superheated steam.

4. The method of claim 3, wherein the mixture injected into the centrifuge includes water via the condensation of the jet of superheated steam.

5. The method of claim 4, wherein the mixture injected into the centrifuge includes from about 3% to about 10% water.

6. The method of claim 1, wherein the mixture injected into the centrifuge includes desalinated fuel and salted water.

7. The method of claim 1, further comprising providing the jet of superheated steam at a pressure which provides injection of the mixture into the centrifuge above at least one of: (i) a selected velocity; and (ii) a selected pressure.

8. The method of claim 7, wherein the selected pressure is about 150 psi.

9. A system for desalting a fuel using a jet pump, comprising:
   a motive fluid nozzle of the jet pump configured to inject a jet of a superheated steam at a selected velocity into a chamber of the jet pump, wherein a pressure region caused by the velocity of the jet of superheated steam draws the fuel into the chamber from a storage tank, wherein the jet of superheated steam and the fuel form a mixture in the chamber;
   a diffuser of the jet pump configured to receive the mixture of the jet of superheated steam and the fuel from the chamber moving at the selected velocity, wherein the fuel in the mixture absorbs moisture and heat from the jet of superheated steam in the diffuser; and
   a centrifuge configured to receive the mixture of the superheated steam and the fuel from the diffuser and desalt the fuel, wherein the jet of superheated steam pumps the fuel from the storage tank to the centrifuge.

10. The system of claim 9, wherein the motive fluid nozzle is configured to provide the jet of superheated steam to impart at least one selected from the group consisting of: (i) a selected speed; (ii) a selected temperature; and (iii) a selected water content of the mixture.

11. The system of claim 9, wherein the motive fluid nozzle is configured to provide the jet of superheated steam at a temperature for transfer of a latent heat of condensation in the mixture.

12. The system of claim 11, wherein the mixture received at the centrifuge includes water via condensation of the jet of superheated steam.

13. The system of claim 12, wherein the mixture of water to fuel received at the centrifuge is from about 3% to about 10%.

14. The system of claim 9, wherein the centrifuge is configured to separate the received mixture into a desalinated fuel and salted water.

15. The system of claim 9, wherein the motive fluid nozzle is configured to provide the jet of superheated steam at a pressure which provides for injection of the mixture into the centrifuge above at least one of: (i) a selected velocity; and (ii) a selected pressure.

16. The system of claim 9, wherein the selected pressure is about 150 psi.

17. The system of claim 9, wherein the chamber further includes a low pressure region configured to draw the fuel from a fuel storage tank into the jet of superheated steam.

18. The system of claim 17, wherein the diffuser is downstream of the low pressure region of the chamber and configured to allow for the heat transfer and water condensation in the mixture.

* * * * *